(12) United States Patent
Tokuchi

(10) Patent No.: US 11,562,232 B2
(45) Date of Patent: Jan. 24, 2023

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Kengo Tokuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 448 days.

(21) Appl. No.: 16/681,936

(22) Filed: Nov. 13, 2019

(65) Prior Publication Data

US 2020/0387784 A1    Dec. 10, 2020

(30) Foreign Application Priority Data

Jun. 4, 2019    (JP) .............................. JP2019-104156

(51) Int. Cl.
*G06K 9/62*    (2022.01)
*G06N 3/08*    (2006.01)
*G06N 20/10*    (2019.01)
*G06N 20/20*    (2019.01)

(52) U.S. Cl.
CPC ............. *G06N 3/08* (2013.01); *G06K 9/6256* (2013.01); *G06N 20/10* (2019.01); *G06N 20/20* (2019.01)

(58) Field of Classification Search
CPC .......... G06N 3/08; G06N 20/10; G06N 20/20; G06N 20/00; G06K 9/6256; G06V 30/19173; G06V 30/10
See application file for complete search history.

(56) References Cited

U.S. PATENT DOCUMENTS

| | | | |
|---|---|---|---|
| 8,306,733 B2 | 11/2012 | Shikimachi | |
| 2003/0158828 A1* | 8/2003 | Ikeda | G06N 3/02 706/46 |
| 2008/0147576 A1* | 6/2008 | Serizawa | G06N 3/08 706/12 |
| 2019/0095527 A1* | 3/2019 | Taniguchi | G06Q 10/107 |
| 2019/0098292 A1* | 3/2019 | Sakai | H04N 1/00129 |
| 2020/0402221 A1* | 12/2020 | Ijiri | G06N 3/08 |

FOREIGN PATENT DOCUMENTS

| | | |
|---|---|---|
| JP | 2010-223824 A | 10/2010 |
| WO | WO 2019187594 | * 10/2019 |

* cited by examiner

*Primary Examiner* — Samir A Ahmed
(74) *Attorney, Agent, or Firm* — Oliff PLC

(57) ABSTRACT

An information processing apparatus includes a controller that causes learning data learned by an artificial intelligence to be recorded in a recording unit in such manner that influencing learning data that has influenced performance of an artificial intelligence and non-influencing learning data that has not influenced performance of an artificial intelligence are distinguishable.

5 Claims, 8 Drawing Sheets

| | INFLUENCE OF LEARNING DATA SET A | | | | |
|---|---|---|---|---|---|
| | CHARACTER RECOGNITION RATE | TRANSLATION ACCURACY | CREATIVITY | PROBLEM-SOLVING ABILITY | ... |
| AI (α) | A | B | C | D | ... |
| AI (β) | C | C | C | D | ... |
| ... | ... | ... | ... | ... | ... |

| | INFLUENCE OF LEARNING DATA SETS A AND B | | | | |
|---|---|---|---|---|---|
| | CHARACTER RECOGNITION RATE | TRANSLATION ACCURACY | CREATIVITY | PROBLEM-SOLVING ABILITY | ... |
| AI (α) | A | B | C | D | ... |
| AI (β) | C | C | C | D | ... |
| ... | ... | ... | ... | ... | ... |

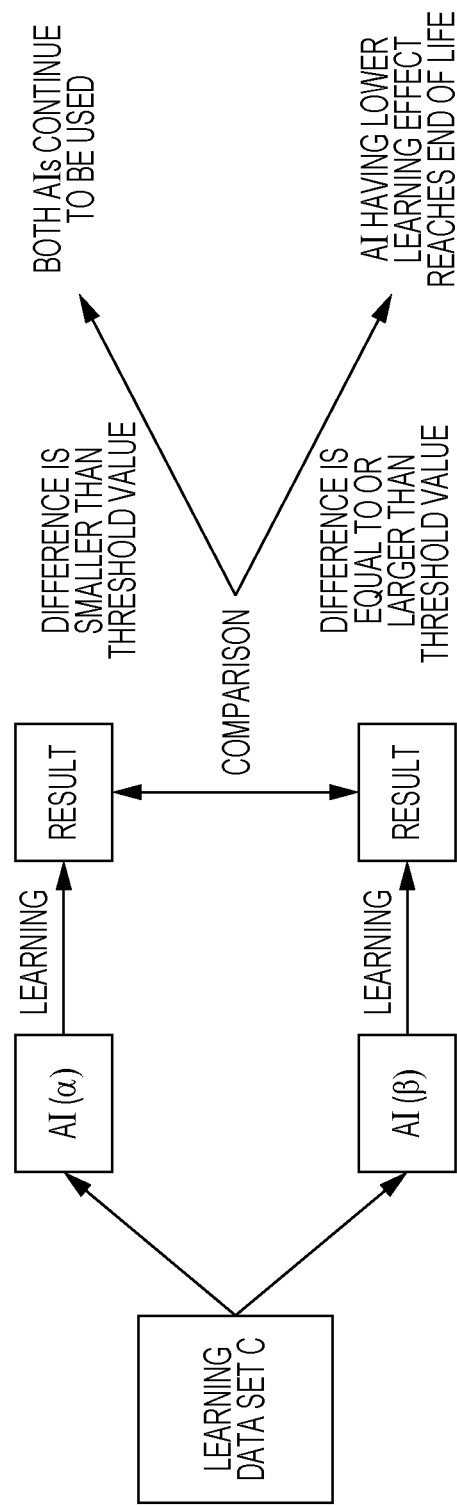

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-104156 filed Jun. 4, 2019.

BACKGROUND

(i) Technical Field

The present disclosure relates to an information processing apparatus and a non-transitory computer readable medium.

(ii) Related Art

In general, learning data is learned by artificial intelligence.

Japanese Unexamined Patent Application Publication No. 2010-223824 describes an apparatus for preventing repeated learning of a wrong new road.

SUMMARY

Aspects of non-limiting embodiments of the present disclosure relate to making it clear whether or not learning data has influenced performance of an artificial intelligence.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a controller that causes learning data learned by an artificial intelligence to be recorded in a recording unit in such manner that influencing learning data that has influenced performance of an artificial intelligence and non-influencing learning data that has not influenced performance of an artificial intelligence are distinguishable.

BRIEF DESCRIPTION OF THE DRAWINGS

Exemplary embodiments of the present disclosure will be described in detail based on the following figures, wherein:

FIG. 14 illustrates a learning data set according to the second modification of the second exemplary embodiment.

DETAILED DESCRIPTION

First Exemplary Embodiment

Figure 1:
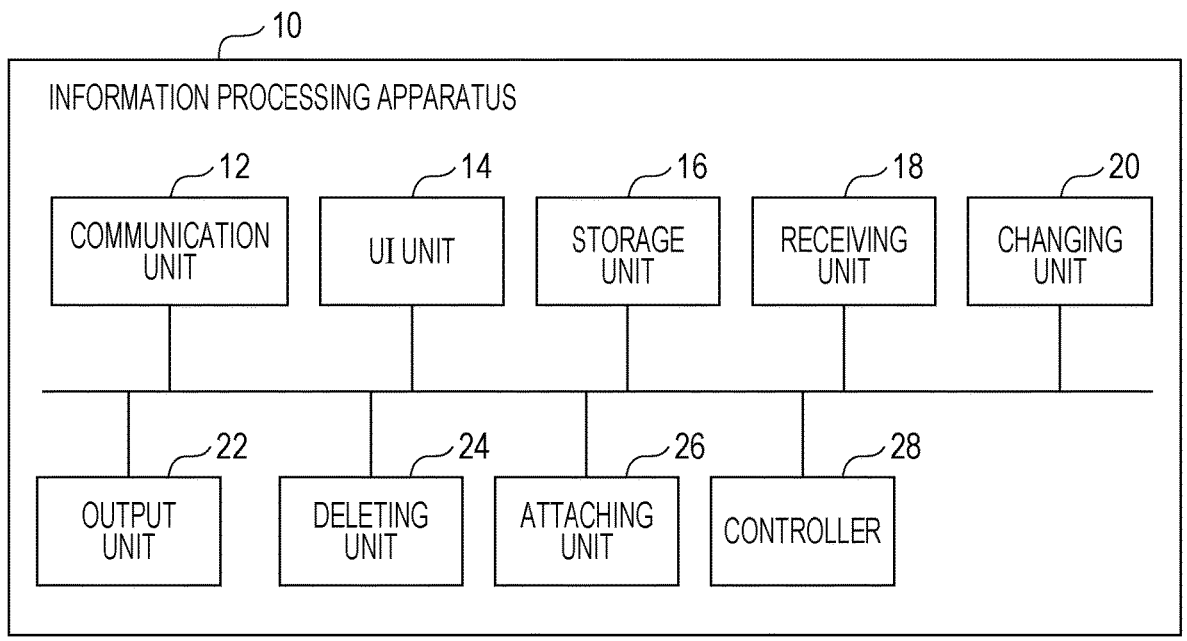
FIG. 1 is a block diagram illustrating a configuration of an information processing apparatus according to a first exemplary embodiment.

An information processing apparatus according to a first exemplary embodiment of the present disclosure is described with reference to FIG. 1. FIG. 1 illustrates an example of the information processing apparatus according to the first exemplary embodiment.

An information processing apparatus 10 according to the first exemplary embodiment is configured to receive learning data and control learning of an artificial intelligence in accordance with information attached to the learning data, the information indicating whether or not to permit an artificial intelligence (i.e., AI) to learn the learning data.

The information processing apparatus 10 is, for example, a personal computer (hereinafter referred to as a "PC"), a tablet PC, a smartphone, a mobile phone, or any of other kinds of apparatuses (e.g., a multifunctional printer having functions such as a print function). Needless to say, the information processing apparatus 10 may be an apparatus other than these apparatuses.

An algorithm used in an artificial intelligence is not limited in particular and may be any algorithm. The algorithm may, for example, be machine learning. The machine learning may be supervised learning, unsupervised learning, or reinforcement learning. Specifically, deep learning (e.g., multi-layer perceptron, convolutional neural network, recurrent neural network, autoencoder, restricted boltzmann machine), perceptron, back propagation, associatron, support vector machine, decision tree, k-nearest neighbor algorithm, linear regression, self-organizing map, boltzmann machine, principal component analysis, cluster analysis, Q-learning, or the like may be used. A genetic algorithm, a hill climbing method, or the like, which is an algorithm other than machine learning, may be used. Needless to say, an algorithm other than these algorithms may be used.

Learning data is data used for learning of an artificial intelligence. For supervised learning, learning data may include a correct judgment (i.e., an answer). For unsupervised learning, learning data may not necessarily include a correct judgment as learning data. Learning data may, for example, be document data (e.g., text data), image data (e.g., still image data or moving image data), music data, audio data, or a combination thereof, and kind, data format, and contents thereof are not limited in particular.

Attribute information is attached to learning data. The attribute information attached to the learning data is information indicating whether or not to permit an artificial intelligence to learn the learning data. The state where the attribute information is attached to the learning data means that the attribute information accompanies the learning data as accompanying information or that the attribute information is embedded in the learning data itself. The attribute information may be added to the learning data as accompanying information or may be associated with the learning data as data separate from the learning data. The state where the attribute information is embedded in the learning data itself is, for example, a state where the attribute information is disposed in an image represented by image data or a state where the attribute information is disposed in a document represented by document data.

The artificial intelligence may be mounted in the information processing apparatus 10 or may be mounted in an apparatus (e.g., a server or a PC) other than the information processing apparatus 10. That is, a program for realizing the artificial intelligence may be stored in the information processing apparatus 10 or may be stored in an apparatus other than the information processing apparatus 10.

A configuration of the information processing apparatus 10 is described in detail below.

A communication unit 12 is a communication interface and has a function of transmitting information to another apparatus and a function of receiving information from another apparatus. The communication unit 12 may have a wireless communication function or may have a wired communication function. The communication unit 12 may communicate with another apparatus through a communication path by using wireless communication or wired communication. The communication path is, for example, a network such as a local area network (LAN) or the Internet. The communication unit 12 may communicate with another apparatus without a communication path by using, for example, close-range wireless communication. The close-range wireless communication is, for example, Bluetooth (Registered Trademark), Radio Frequency Identifier (RFID), or NFC.

For example, in a case where learning data is transmitted from an apparatus other than the information processing apparatus 10 to the information processing apparatus 10, the communication unit 12 receives the learning data. In a case where attribute information is attached to the learning data, the communication unit 12 also receives the attribute information. Furthermore, the communication unit 12 may transmit the learning data to another apparatus.

A UI unit 14 is a user interface. Examples include a display and an operation unit. The display is a display device such as a liquid crystal display. The operation unit is an input unit such as a keyboard, an input key, or an operation panel. A touch panel, which serves both as a display and an operation unit, is also an example of the UI unit 14.

A storage unit 16 is one or more storage regions in which various kinds of information are stored. Each of the storage regions is constituted, for example, by one or more storage devices (e.g., a physical drive such as a hard disk drive or a memory) provided in the information processing apparatus 10. Learning data may be stored in the storage unit 16.

A receiving unit 18 is configured to receive learning data. For example, in a case where the communication unit 12 receives learning data transmitted from an apparatus other than the information processing apparatus 10, the receiving unit 18 receives the learning data received by the communication unit 12. In a case where the communication unit 12 receives attribute information attached to the learning data, the receiving unit 18 also receives the attribute information. Furthermore, in a case where learning data is supplied to the information processing apparatus 10 through the UI unit 14 or in a case where learning data is supplied to the information processing apparatus 10 by using a storage device (e.g., a hard disk drive, a USB memory, a CD, a DVD, or any of other portable storage media), the receiving unit 18 receives the supplied learning data. In a case where attribute information is attached to the supplied learning data, the receiving unit 18 also receives the attribute information.

A changing unit 20 is configured to change learning processing of artificial intelligence in accordance with attribute information attached to learning data.

In a case where attribute information attached to learning data indicates that learning of the learning data by an artificial intelligence is permitted, the changing unit 20 permits learning of the learning data by an artificial intelligence. For example, in a case where a user gives an instruction to cause an artificial intelligence to learn the learning data by operating the UI unit 14, a controller 28 causes the artificial intelligence to learn the learning data. The user may designate a particular artificial intelligence that learns the learning data and cause this artificial intelligence to learn the learning data.

In a case where attribute information attached to learning data indicates that learning of the learning data by an artificial intelligence is not permitted, the changing unit 20 prohibits learning of the learning data by an artificial intelligence. That is, the changing unit 20 does not permit an artificial intelligence to learn the learning data. For example, even in a case where the user gives an instruction to cause an artificial intelligence to learn the learning data by operating the UI unit 14, the controller 28 does not cause the artificial intelligence to learn the learning data.

Attribute information attached to learning data may indicate that learning of only a certain part of the learning data is permitted but learning of the rest of the learning data is prohibited. Alternatively, attribute information attached to learning data may indicate that learning of all of the learning data is permitted or prohibited.

In a case where attribute information attached to learning data indicates that learning of the learning data by an artificial intelligence is not permitted, if a purpose of learning of the learning data by an artificial intelligence satisfies a certain condition, the changing unit 20 may permit the artificial intelligence to learn the learning data. For example, in a case where the purpose of learning is a highly public purpose such as a medical purpose or an educational purpose, the changing unit 20 may permit the artificial intelligence to learn the learning data.

An output unit 22 is configured to output a warning when an attempt to change learning data is being made without a permission in a case where attribute information of the learning data indicates that the learning of the learning data by an artificial intelligence is not permitted. The attempt to change learning data without a permission is an attempt to change learning data by a user who does not have an authority to change the learning data. A user may be given an authority to change any learning data sets or a particular learning data set.

For example, learning data may be associated with user identification information (e.g., a user name, a user ID, a password) for identifying users who have an authority to change the learning data. In a case where user identification information of a user who is trying to change the learning data is associated with the learning data, the controller 28 permits the user to change the learning data. Specifically, in a case where this user performs an operation for changing the learning data on the UI unit 14, the controller 28 accepts the operation and changes the learning data in accordance with the user's operation. In a case where user identification information of a user who is trying to change the learning data is not associated with the learning data, the controller 28 prohibits the user from changing the learning data. Specifically, in a case where the user performs an operation for changing the learning data on the UI unit 14, the controller 28 reject the operation and does not change the learning data. Note that an operation for changing learning data may be performed at an apparatus (e.g., a PC) other than the information processing apparatus 10.

User identification information of a user may be collected when the user logs into the information processing apparatus or an equivalent, or when the user is trying to change learning data. For example, the controller 28 causes an entry screen for entry of user identification information of the user to be displayed on the display of the UI unit 14 when the user designates learning data by operating the UI unit 14. For another example, the controller 28 causes an entry screen for entry of user identification information of the user to be displayed on the display of the UI unit 14 when the user logs into the information processing apparatus 10. The controller 28 permits change of the learning data.

The output unit 22 may output a warning in various forms. For example, the output unit 22 may cause information indicative of a warning to be displayed on the display of the UI unit 14, may transmit information indicative of a warning to an apparatus (e.g., a PC) that has transmitted the learning data to the information processing apparatus 10, may cause a speaker to generate warning sound, or may transmit information indicative of a warning to an apparatus (e.g., a PC or the like used by an administrator) registered in advance.

A deleting unit 24 is configured to delete learning data when an attempt to change the learning data is being made without a permission in a case where attribute information attached to the learning data indicates that learning of the learning data by an artificial intelligence is not permitted. As described above, an attempt to change the learning data without permission is an attempt to change the learning data by a user who does not have an authority to change the learning data.

For example, in a case where an attempt to change learning data stored in the storage unit 16 is made without a permission, the deleting unit 24 deletes the learning data from the storage unit 16. In a case where an attempt to change learning data stored in an apparatus (e.g., a PC or a server) other than the information processing apparatus 10 is made without a permission, the deleting unit 24 may delete the learning data from the other apparatus.

The deleting unit 24 may delete learning data received by the receiving unit 18 of which learning by an artificial intelligence is not permitted.

An attaching unit 26 is configured to attach attribute information to the content data. The content data is, for example, document data (e.g., text data), image data (e.g., still image data or moving image data), music data, audio data, or a combination thereof, and kind, data format, contents thereof are not limited in particular. The content data to which attribute information is attached is an example of learning data to which attribute information is attached.

The attaching unit 26 may not necessarily be provided in the information apparatus 10, and may be provided in an apparatus different from an apparatus that has the changing unit 20. In this case, the processing of the attaching unit 26 is executed by the apparatus where the attaching unit 26 is provided.

The controller 28 is configured to control operation of each unit of the information processing apparatus 10.

Figure 2:
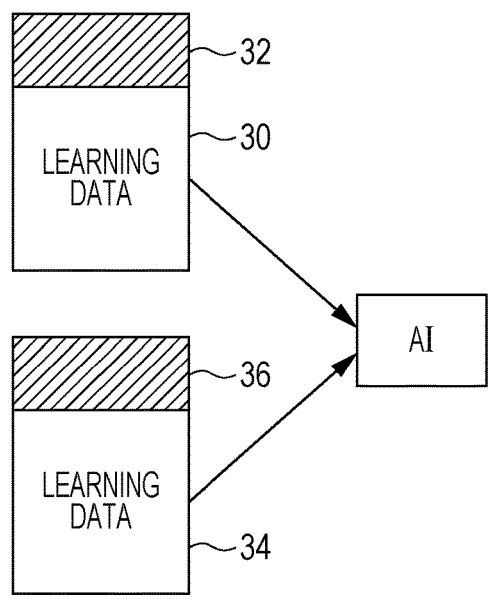
FIG. 2 illustrates learning data according to the first exemplary embodiment.

Processing of the information processing apparatus 10 is described below with reference to FIG. 2. FIG. 2 illustrates an example of learning data according to the first exemplary embodiment.

Attribute information 32 is attached to learning data 30. The attribute information 32 is information indicating that artificial intelligence is permitted to learn the learning data 30. Attribute information 36 is attached to learning data 34. The attribute information 36 is information indicating that learning of the learning data 34 by an artificial intelligence is not permitted.

In a case where the learning data 30 is about to be learned by an artificial intelligence ("AI" in FIG. 2) (e.g., in a case where a user gives an instruction to cause an artificial intelligence to learn the learning data 30), the changing unit 20 permits the artificial intelligence to learn the learning data 30 or prohibits the artificial intelligence from learning the learning data 30 on the basis of the attribute information 32 attached to the learning data 30. Since the attribute information 32 is information indicating that learning of the learning data 30 by an artificial intelligence is permitted, the changing unit 20 permits the artificial intelligence to learn the learning data 30.

Similarly, in a case where the learning data 34 is about to be learned by artificial intelligence, the changing unit 20 permits the artificial intelligence to learn the learning data 34 or prohibits the artificial intelligence from learning the learning data 34 on the basis of the attribute information 36 attached to the learning data 34. Since the attribute information 36 is information indicating that learning of the learning data 34 by an artificial intelligence is not permitted, the changing unit 20 prohibits the artificial intelligence from learning the learning data 34. This makes it possible to prevent learning data that is not meant to be learned by an artificial intelligence from being learned by the artificial intelligence.

Figure 3:
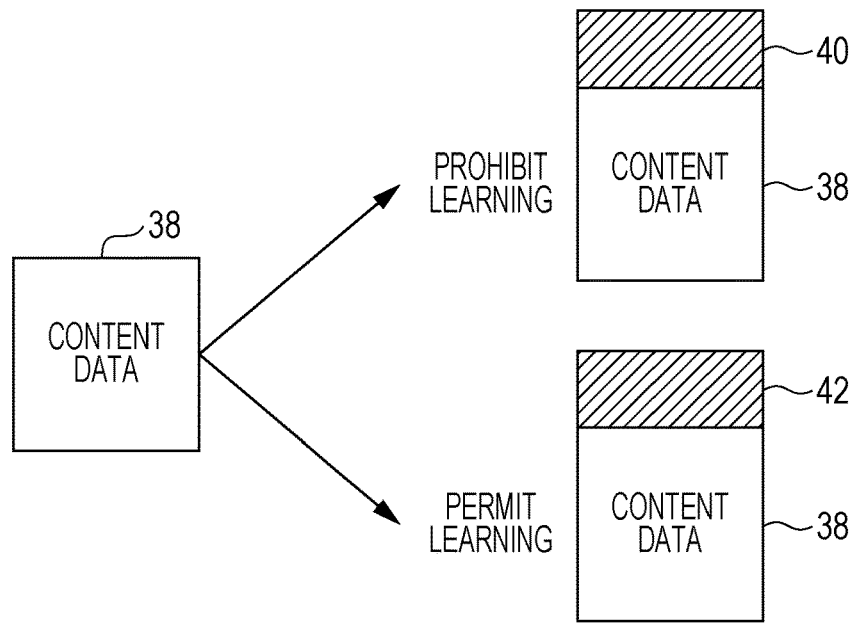
FIG. 3 illustrates content data according to the first exemplary embodiment.

Processing for creating learning data is described below with reference to FIG. 3. FIG. 3 illustrates an example of content data according to the first exemplary embodiment.

The attaching unit 26 attaches attribute information to content data 38. The content data 38 to which the attribute information is attached is an example of learning data to which attribute information is attached. Attribute information 40 is information indicating that learning by an artificial intelligence is not permitted. If the attribute information 40 is attached to the content data 38, the content data is prohibited from being learned by an artificial intelligence. Attribute information 42 is information indicating that learning by an artificial intelligence is permitted. If the attribute information 40 is attached to the content data 38, the content data 38 is permitted to be learned by an artificial intelligence.

For example, by operating the UI unit 14, a user may designate content data 38 to which attribute information is to be attached and may designate whether or not to permit learning of the content data 38 by an artificial intelligence. In a case where the user permits learning of the content data 38 by an artificial intelligence, the attaching unit 26 attaches the attribute information 42 to the content data 38 designated by the user. In a case where the user does not permit artificial intelligence to learn the content data 38, the attaching unit 26 attaches the attribute information 40 to the content data 38 designated by the user. Needless to say, attribute information may be attached to learning data by an apparatus (e.g., a PC or a server) other than the information processing apparatus 10.

Whether or not to permit learning of the content data 38 by an artificial intelligence may be designated by a user who created the content data 38, a user who provided the content data 38, a user who purchased the content data 38, a user who has an authority to use the content data 38, an administrator who manages the content data 38, or a user other than these users.

For example, when the content data 38 is created by a user, the attaching unit 26 attaches attribute information to the content data 38. The attaching unit 26 may attach attribute information to the content data 38 in accordance with an instruction from the user to attach attribute information to the content data 38 or may attach attribute information to the content data 38 when the content data 38 is completed without an instruction from the user.

The attaching unit 26 may attach attribute information to the content data 38 regardless of an instruction from a user. For example, in a case where the content data 38 includes a wrong answer, the attaching unit 26 may attach the attribute information 40 indicating that learning of the content data 38 by an artificial intelligence is not permitted to the content data 38. The case where the content data 38 includes a wrong answer is, for example, a case where the content data 38 used as learning data for translation includes wrong translation data, a case where the content data 38 used as learning data for image recognition includes information indicative of an object different from an object represented by the content data 38, or a case where the content data 38 used as learning data for character recognition includes information indicative of a character different from a character represented by the content data 38.

The attaching unit 26 determines whether or not the content data 38 includes a wrong answer by analyzing the content data 38. If the content data 38 includes a wrong answer, the attaching unit 26 attaches the attribute information 40 indicating that learning by an artificial intelligence is not permitted to the content data 38. The attaching unit 26 may attach the attribute information 40 indicating that learning by an artificial intelligence is not permitted to the content data 38 if a ratio of wrong answers or the number of appearances of a wrong answer is equal to or larger than a predetermined threshold value.

In a case where the content data 38 does not include a wrong answer, the attaching unit 26 attaches the attribute information 42 indicating that learning of by an artificial intelligence is permitted to the content data 38. The attaching unit 26 may attach the attribute information 42 to the content data 38 if a ratio of wrong answers or the number of appearances of a wrong answer is less than a predetermined threshold value.

In a case where the content data 38 includes information concerning security, the attaching unit 26 may attach the attribute information 40 indicating that learning by an artificial intelligence is not permitted to the content data 38. In a case where the content data 38 does not include information concerning security, the attaching unit 26 may attach the attribute information 42 indicating that learning by an artificial intelligence is permitted to the content data 38. Examples of information concerning security include personal information, information concerning a trade secret, and information set as non-disclosed information by a public institution (e.g., an administrative institution). Examples of personal information include information indicative of a name, a birth date, a user ID, a password, and the like of a specific individual. The attaching unit 26 determines whether or not the content data 38 includes information concerning security by analyzing the content data 38. If the content data 38 includes information concerning security, the attribute information 40 indicating that learning by an artificial intelligence is not permitted is attached to the content data 38, and therefore leakage of the information concerning security resulting from learning of the content data 38 by an artificial intelligence is prevented.

The changing unit 20 may be configured to change learning processing of artificial intelligence in accordance with attribute information attached to learning data indicating a particular period. Attribute information attached to learning data may include permitted period information indicative of a permitted period in which artificial intelligence is permitted to learn the learning data. That is, attribute information may restrict a period during which learning data to which the attribute information is attached is permitted. At any time outside the permitted period, learning of the learning data by an artificial intelligence is prohibited. A period during which learning of the learning data by an artificial intelligence is prohibited may be referred to as a prohibited period. The permitted period is decided, for example, by a date, a time zone, a time, or the like. In a case where a time point (e.g., a date or a time) at which the learning data is about to be learned by an artificial intelligence falls in the permitted period, the changing unit 20 permits the artificial intelligence to learn the learning data. In a case where a time point at which the learning data is about to be learned by an artificial intelligence does not fall in the permitted period, the changing unit 20 prohibits the artificial intelligence from learning the learning data. For example, a period during which learning data is not yet disclosed to the public may be set as a prohibited period, and time after the learning data is disclosed to the public may be set as a permitted period. According to this setting, learning of the learning data by an artificial intelligence is permitted after the learning data is disclosed to the public, and learning of the learning data by an artificial intelligence is prohibited while the learning data is not yet disclosed to the public. Needless to say, the permitted period may be set for other purposes. The permitted period may be set by a user who has an authority to set the permitted period. For example, attribute information including permitted period information may be attached to learning data when the learning data is created. This processing may be executed by the attaching unit 26.

The changing unit 20 may be configured to change learning processing of artificial intelligence in accordance with attribute information attached to learning data indicating a limit on the number of times the learning data can be learned. Attribute information attached to learning data may include number information indicative of a limit on the number of times of learning of the learning data. The controller 28 counts the number of times the learning data was learned by an artificial intelligence and attaches information indicative of the number to the learning data. In a case where the number of times of learning exceeds the limit, learning of the learning data is prohibited. That is, even when a user instructs the controller 28 to cause an artificial intelligence to learn the learning data, the controller 28 does not cause the artificial intelligence to learn the learning data. The controller 28 may count the number of times of learning by different artificial intelligences cumulatively or separately. When the number of times of learning by different artificial intelligences is counted cumulatively, learning data whose number of times of learning exceeds the limit is prohibited from being learned by any artificial intelligences. The limit may be set by a user who has an authority to set a limit on the number of times of learning.

Note that the counter for the learning data whose number of times of learning exceeded the limit may be reset to 0 by the user who has an authority to set a limit on the number of times of learning. For example, attribute information including number information is attached to the learning data when the learning data is created. This processing may be executed by the attaching unit 26.

The changing unit 20 may be configured to change learning processing of artificial intelligence in accordance with attribute information attached to learning data indicating a particular artificial intelligence. Attribute information attached to learning data may include information indicating an artificial intelligence permitted to learn the learning data and/or an artificial intelligence prohibited from learning the learning data. For example, attribute information may indicate one or more predetermined artificial intelligences that are permitted to learn the learning data. For another example, attribute information may indicate one or more predetermined apparatuses whose artificial intelligences are permitted to learn the learning data. The one or more predetermined apparatuses may be particular apparatuses (e.g., the information processing apparatus 10, a particular personal computer) or apparatuses at a particular facility. When the leaning data is related to the field of medicine, for example, apparatus in hospitals or medical schools may be set as the predetermined apparatuses. Artificial intelligences mounted in an apparatus other than the permitted apparatuses are prohibited from learning the learning data. Since data concerning the field of medicine often includes personal information, there may be a situation where it is desired to permit learning of the learning data by only limited artificial intelligences and prohibit learning of the data by artificial intelligences other than the limited artificial intelligences. This can prevent or suppress leakage of the personal information. This exemplary use in the field of medicine is just an example, and the present disclosure may be applicable to other fields. An artificial intelligence permitted to learn the learning data may be set by a user who has an authority to make this setting. Attribute information including information indicative of an artificial intelligence permitted to learn the learning data is attached to the learning data when, for example, the learning data is created. This processing may be executed by the attaching unit 26.

The changing unit 20 may be configured to change learning processing of artificial intelligence in accordance with attribute information attached to learning data indicating a learning method. Attribute information attached to learning data may include information indicating a learning method permitted to be used to learn the learning data and/or a learning method prohibited from being used to learn the learning data. Example of learning method of an artificial intelligence is an algorithm used in the artificial intelligence. Learning data suitable for learning sometimes differs depending on the algorithm of the artificial intelligence. For example, in a case where an artificial intelligence learns learning data, performance of the artificial intelligence improves in some cases but decreases in other cases depending on an algorithm of the artificial intelligence. Furthermore, the performance of the artificial intelligence does not change in some cases. Learning data that improves performance of an artificial intelligence as a result of learning is learning data suitable for learning of the artificial intelligence. An artificial intelligence whose performance improves as a result of learning of learning data is an artificial intelligence permitted to learn the learning data. Meanwhile, an artificial intelligence whose performance does not improve (i.e., an artificial intelligence whose performance decreases or an artificial intelligence whose performance does not change) as a result of learning of learning data is artificial intelligence prohibited from learning the learning data. For example, whether or not performance of each artificial intelligence improves as a result of learning varies depending on of a learning history of learning of each learning data by the artificial intelligence. Attribute information attached to learning data includes information indicative of an algorithm of an artificial intelligence whose performance improves as a result of learning of the learning data as information indicative of an algorithm of an artificial intelligence permitted to learn the learning data. An attribute information including information indicative of an algorithm of artificial intelligence whose performance improves as a result of learning of the learning data is attached to the learning data when, for example, learning data is created. This processing may be executed by the attaching unit 26. In a case where an algorithm of an artificial intelligence attempting to learn the learning data is an algorithm of artificial intelligence whose performance improves as a result of learning of the learning data, the changing unit 20 permits the artificial intelligence to learn the learning data. In a case where an algorithm of an artificial intelligence attempting to learn the learning data is an algorithm of an artificial intelligence whose performance does not improve as a result of learning of the learning data, the changing unit 20 prohibits the artificial intelligence from learning the learning data. This allows an artificial intelligence to learn learning data that improves performance of the artificial intelligence. Learning data that does not change performance of an artificial intelligence as a result of learning may be set as learning data which the artificial intelligence is permitted to learn.

The changing unit 20 may be configured to change learning processing of artificial intelligence in accordance with attribute information attached to learning data indicating a field of use. Attribute information attached to learning data may include information indicative of a field in which learning is permitted and/or a field in which the learning data is prohibited from being used. Examples of fields of use include, but not limited to, medicine, education, character recognition, translation, and business. For example, in a case where information indicative of a medical field is included in attribute information as information indicative of a field in which learning is permitted, learning data to which the attribute information is attached is learning data which an artificial intelligence used in a medical field is permitted to learn. In a case where an artificial intelligence attempting to learn the learning data is an artificial intelligence used in a medical field, the changing unit 20 permits the artificial intelligence to learn the learning data. In a case where an artificial intelligence attempting to learn the learning data is an artificial intelligence that is not used in a medical field, the changing unit 20 prohibits the artificial intelligence from learning the learning data. This allows an artificial intelligence to learn learning data suitable for a field of use of the artificial intelligence. Attribute information including information indicative of a field in which learning of learning data is permitted is attached to the learning data when, for example, the learning data is created. This processing may be executed by the attaching unit 26. Information indicative of plural fields may be included in the attribute information. In this case, an artificial intelligence used in at least one of the plural fields may be permitted to learn the learning data. Alternatively, an artificial intelligence used in all of the plural fields may be permitted to learn the learning data.

The changing unit 20 may permit or prohibit learning of learning data by an artificial intelligence in accordance with a user who uses the learning data. For example, attribute information attached to the learning data indicates user identification information of users permitted to cause an artificial intelligence to learn the learning data. In a case where user identification information of a user who has instructed the controller 28 to cause an artificial intelligence to learn the learning data is included in attribute information attached to the learning data, the changing unit 20 permits the learning of the learning data by the artificial intelligence. In a case where user identification information of a user who has instructed the controller 28 to cause an artificial intelligence to learn the learning data is not included in attribute information attached to the learning data, the changing unit 20 prohibits the learning of the learning data by the artificial intelligence. Attribute information including user identification information of users permitted to cause an artificial intelligence to learn the learning data is attached to the learning data when, for example, learning data is created. This processing may be executed by the attaching unit 26.

In the first exemplary embodiment, in a case where learning of learning data by an artificial intelligence is prohibited, the controller 28 may transmit, to a creator of the learning data, information inquiring whether or not to permit learning of the learning data by an artificial intelligence. For example, attribute information attached to learning data may include information indicative of an e-mail address of the creator of the learning data or an address of an apparatus used by the creator. The controller 28 transmits the inquiry information to the e-mail address or the address of the apparatus. In a case where the creator permits learning of the learning data by an artificial intelligence, information indicative of the permission is transmitted to the information processing apparatus 10 by e-mail or transmitted to the information processing apparatus 10 from the apparatus used by the creator. With the permission from the creator, the changing unit 20 permits learning of the learning data by an artificial intelligence. In a case where the creator prohibits or does not permit learning of the learning data by an artificial intelligence, information indicative of the prohibition is transmitted to the information processing apparatus 10 by e-mail or transmitted to the information processing apparatus 10 from the apparatus used by the creator. In this case, the changing unit 20 prohibits learning of the learning data by an artificial intelligence.

In the first exemplary embodiment, the receiving unit 18 may receive learning data with attached attribute information that indicates that learning of the learning data by an artificial intelligence is prohibited. In a case where the learning data received by the receiving unit 18 does not have attribute information indicating that learning of the learning data by an artificial intelligence is prohibited, the changing unit 20 permits learning of the learning data by an artificial intelligence. In this example, the changing unit 20 is regarded as an example of a prohibiting unit.

In another example, the receiving unit 18 may receive learning data with attached attribute information that indicates that learning of the learning data by an artificial intelligence is permitted. In a case where the learning data received by the receiving unit 18 does not have attribute information indicating that learning of the learning data by an artificial intelligence is permitted, the changing unit 20 prohibits learning of the learning data by an artificial intelligence. In this example, the changing unit 20 is regarded as an example of a permitting unit.

What the changing unit 20, the output unit 22, the deleting unit 24, and the attaching unit 26 does in the exemplary embodiment may be executed by an artificial intelligence. For example, an artificial intelligence instructed to learn learning data may execute what these units does in the exemplary embodiment.

Second Exemplary Embodiment

Figure 4:
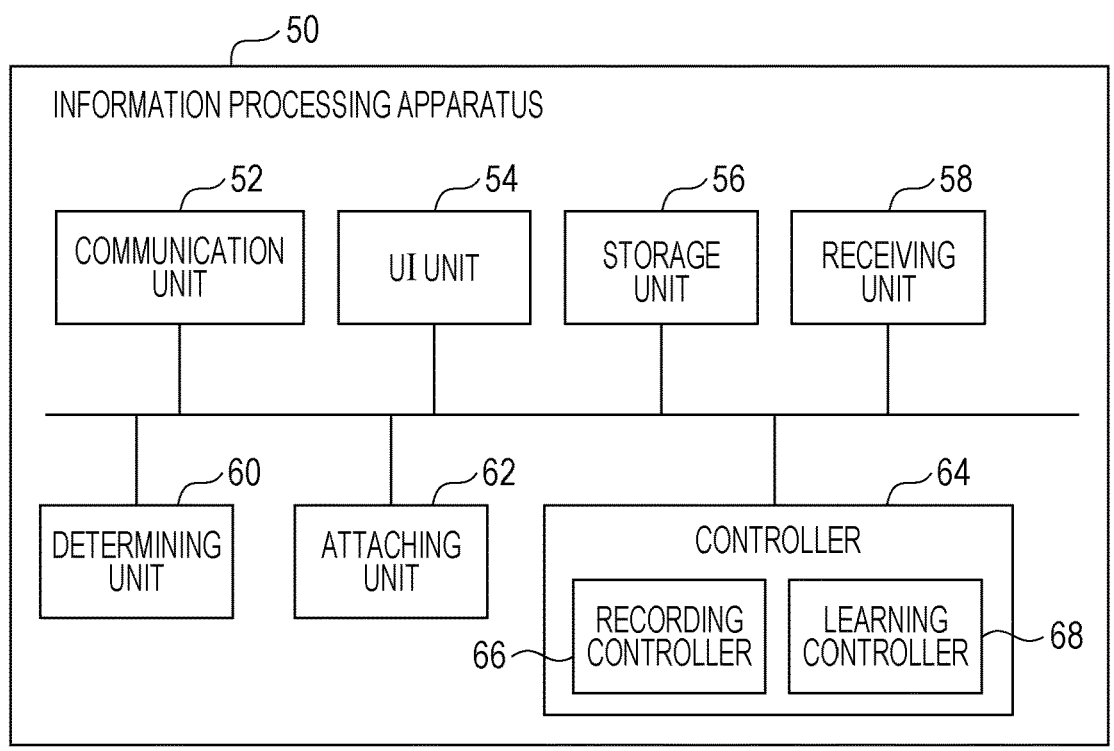
FIG. 4 is a block diagram illustrating a configuration of an information processing apparatus according to a second exemplary embodiment.

An information processing apparatus according to a second exemplary embodiment of the present disclosure is described with reference to FIG. 4. FIG. 4 illustrates an example of the information processing apparatus according to the second exemplary embodiment.

An information processing apparatus 50 according to the second exemplary embodiment is configured to classify learning data learned by an artificial intelligence as influencing learning data or non-influencing learning data. The information processing apparatus 50 may classify learning data that has influenced performance of the artificial intelligence as influencing learning data and learning data that has not influenced performance of the artificial intelligence as non-influencing learning data, and record the learning data in a recording unit in such manner that influencing learning data and non-influencing learning data are distinguishable.

The information processing apparatus 50 may classify influencing learning data learned by an artificial intelligence as improving learning data or decreasing learning data. The information processing apparatus 50 may classify influencing learning data that has improved performance of an artificial intelligence as improving learning data and influencing learning data that has decreased performance of an artificial intelligence as decreasing learning data, and record the influencing learning data in the recording unit in such manner that improving learning data and decreasing learning data are distinguishable.

The information processing apparatus 50 may classify learning data learned by an artificial intelligence as improving learning data or non-improving learning data. The information processing apparatus 50 may classify learning data that has improved performance of the artificial intelligence as improving learning data and learning data that has decreased performance of the artificial intelligence as non-improving learning data, and record the learning data in the recording unit in such manner that improving learning data and non-improving learning data are distinguishable.

The information processing apparatus 50 is, for example, a PC, a tablet PC, a smartphone, a mobile phone, or any of other kinds of apparatuses (e.g., a multifunctional printer having functions such as a print function). Needless to say, an apparatus other than these apparatuses may be the information processing apparatus 50.

As in the first exemplary embodiment, an algorithm used in an artificial intelligence is not limited in particular, and an algorithm described in the first exemplary embodiment may be used.

Learning data is data used for learning by an artificial intelligence. As in the first exemplary embodiment, learning data may be learning data used for supervised learning or may be learning data used for unsupervised learning. A kind, a data format, and contents of learning data are not limited in particular.

An artificial intelligence may be mounted in the information processing apparatus 50 or may be mounted in an apparatus (e.g., a server or a PC) other than the information processing apparatus 50. That is, a program for realizing an artificial intelligence may be stored in the information processing apparatus 50 or may be stored in an apparatus other than the information processing apparatus 50.

A configuration of the information processing apparatus 50 is described in detail below.

A communication unit 52 is a communication interface and has a function of transmitting information to another apparatus and a function of receiving information from another apparatus. The communication unit 52 may have a wireless communication function or may have a wired communication function. The communication unit 52 may communicate with another apparatus through a communication path by using wireless communication or wired communication. The communication path is, for example, a network such as a LAN or the Internet. The communication unit 52 may communicate with another apparatus without a communication path by using, for example, close-range wireless communication. The close-range wireless communication is, for example, Bluetooth (Registered Trademark), RFID, or NFC.

For example, in a case where learning data is transmitted from an apparatus other than the information processing apparatus 50 to the information processing apparatus 50, the communication unit 52 receives the learning data. Furthermore, the communication unit 52 may transmit the learning data to another apparatus.

A UI unit 54 is a user interface. Examples include a display and an operation unit. The display is a display device such as a liquid crystal display. The operation unit is an input unit such as a keyboard, an input key, or an operation panel. A touch panel, which serves both as a display and an operation unit, is also an example of the UI unit 54.

A storage unit 56 is one or more storage regions in which various kinds of information are stored. Each of the storage regions is constituted, for example, by one or more storage devices (e.g., a physical drive such as a hard disk drive or a memory) provided in the information processing apparatus 50. Learning data may be stored in the storage unit 56.

A receiving unit 58 is configured to receive learning data. For example, in a case where the communication unit 52 receives learning data transmitted from an apparatus other than the information processing apparatus 50, the receiving unit 58 receives the learning data received by the communication unit 52. Furthermore, in a case where learning data is supplied to the information processing apparatus 50 through the UI unit 54 or in a case where learning data is supplied to the information processing apparatus 50 by using a storage device (e.g., a hard disk drive, a USB memory, a CD, a DVD, or any of other portable storage media), the receiving unit 58 receives the supplied learning data.

A determining unit 60 is configured to determine whether or not learning data learned by an artificial intelligence has influenced performance of the artificial intelligence and classify the learning data as influencing learning data that has influenced performance of the artificial intelligence or non-influencing learning data that has not influenced performance of the artificial intelligence. This makes it clear whether or not the learning data has influenced performance of the artificial intelligence. The learning data classified as the influencing learning data or the non-influencing learning data may be recorded in the recording unit.

A scope of the concept of the influencing learning data encompasses improving learning data and decreasing learning data. Improving learning data is learning data that has improved performance of an artificial intelligence that has learned the learning data. Decreasing learning data is learning data that has decreased performance of an artificial intelligence that has learned the learning data. The non-influencing learning data is learning data that has not changed performance of an artificial intelligence that has learned the learning data. This makes it clear whether or not learning data has improved or decreased performance of an artificial intelligence. In a case where a difference in performance of an artificial intelligence before and after learning of learning data is less than a threshold value, the determining unit 60 may classify the learning data as non-influencing learning data.

The determining unit 60 may classify influencing learning data learned by an artificial intelligence as improving learning data or decreasing learning data. Learning data classified into improving learning data or decreasing learning data may be recorded in the recording unit.

Performance of an artificial intelligence is performance concerning a function of the artificial intelligence. Examples of functions of an artificial intelligence include, but are not limited to, character recognition, image recognition, voice recognition, object recognition, translation, creativity (e.g., creativity in a field such as business or art), and problem-solving (ability to solve a problem in a field such as business).

The determining unit 60 may classify, for each artificial intelligence, learning data as influencing learning data or non-influencing learning data. Furthermore, the determining unit 60 may classify, for each artificial intelligence, learning data as improving learning data or decreasing learning data.

The determining unit 60 may classify, for each function of artificial intelligence, learning data as influencing learning data or non-influencing learning data. Furthermore, the determining unit 60 may classify, for each function of artificial intelligence, learning data as improving learning data or decreasing learning data.

The determining unit 60 executes a test for determining whether or not learning data has influenced performance of an artificial intelligence service. For example, the determining unit 60 causes an artificial intelligence to learn learning data and determines whether or not performance of the artificial intelligence has changed before and after the learning.

To determine whether or not learning data has influenced performance concerning a character recognition function, the determining unit 60 may perform the following. The determining unit 60 first gives predetermined document data (test data) to an artificial intelligence that has not learned the learning data. Then, the determining unit 60 causes the artificial intelligence to recognize characters included in the test data, and calculates character recognition accuracy (e.g., a character recognition rate).

Next, the determining unit 60 causes the artificial intelligence to learn the learning data. Then, the determining unit 60 gives the test data to the artificial intelligence that has learned the learning data, causes the artificial intelligence to recognize the characters included in the document data, and calculates character recognition accuracy.

The determining unit 60 determines whether or not the character recognition accuracy has changed before and after the learning. In a case where the character recognition accuracy has changed before and after the learning, the determining unit 60 determines that the learning data has influenced performance concerning the character recognition function of the artificial intelligence, whereas in a case where the character recognition accuracy has not changed before and after the learning, the determining unit 60 determines that the learning data has not influenced performance concerning the character recognition function of the artificial intelligence. In a case where the character recognition accuracy has changed before and after the learning, the determining unit 60 classifies the learning data as influencing learning data, whereas in a case where the character recognition accuracy has not changed before and after the learning, the determining unit 60 classifies the learning data as non-influencing learning data.

Furthermore, in a case where the character recognition accuracy after the learning is higher than the character recognition accuracy before the learning, the determining unit 60 determines that the learning data is learning data that has improved performance concerning the character recognition function of the artificial intelligence, whereas in a case where the character recognition accuracy after the learning is lower than the character recognition accuracy before the learning, the determining unit 60 determines that the learning data is learning data that has decreased the performance concerning the character recognition function of the artificial intelligence. In a case where the character recognition accuracy after the learning is higher than the character recognition accuracy before the learning, the determining unit 60 classifies the learning data as improving learning data, whereas in a case where the character recognition accuracy after the learning is lower than the character recognition accuracy before the learning, the determining unit 60 classifies the learning data as non-improving learning data.

Similarly, the determining unit 60 determines whether or not learning data has influenced performance of functions of the artificial intelligence other than character recognition. For example, image recognition accuracy (e.g., rate of accurate recognition) of image test data is calculated before and after the artificial intelligence learns image learning data, and the image learning data is classified on the basis of a result of the calculation. For example, if an artificial intelligence that cannot recognize a cat in an image learns learning data comprising images of cats and becomes able to recognize a cat in an image, this means that performance concerning an image recognition function of the artificial intelligence has improved thanks to the learning. On the other hand, if the artificial intelligence still cannot recognize a cat in an image even after the learning, this means that performance concerning the image recognition function of the artificial intelligence has not improved by the learning.

The determining unit 60 may determine whether or not learning data learned by an artificial intelligence has improved performance of the artificial intelligence and classify the learning data as improving learning data that has improved the performance of the artificial intelligence or non-improving learning data that has not improved the performance of the artificial intelligence. This makes it clear whether or not the learning data has improved the performance of the artificial intelligence. The learning data classified as improving learning data or non-improving learning data may be recorded in the recording unit. In a case where a difference between performance of the artificial intelligence before learning of the learning data and performance of the artificial intelligence after learning of the learning data is less than a threshold value, the determining unit 60 may classify the learning data as non-improving learning data. The determining unit 60 may determine, for each artificial intelligence, whether or not learning data learned by the artificial intelligence has improved performance of the artificial intelligence and classify, for each function of artificial intelligence, learning data as improving learning data or non-improving learning data.

Note that the determining unit 60 may make the determination for learning data designated by a user or designated in advance.

An attaching unit 62 is configured to attach determination result information to learning data. The determination result information indicates a result of the determination made by the determining unit 60 for the learning data. The attaching unit 62 may attach the determination result information to learning data as accompanying information or may embed the determination result information in the learning data itself. Note that the attaching unit 62 may attach attribute information according to the first exemplary embodiment to the learning data.

A controller 64 is configured to control operation of each unit of the information processing apparatus 50. The controller 64 includes a recording controller 66 and a learning controller 68.

The recording controller 66 is configured to record, in the recording unit, learning data to which determination result information is attached. For example, the recording controller 66 classifies learning data as influencing learning data or non-influencing learning data and then records the learning data in the recording unit. The recording controller 66 may classify influencing learning data as improving learning data or decreasing learning data and then record the influencing learning data in the recording unit. The recording controller 66 may classify learning data as improving learning data or non-improving learning data and then record the learning data in the recording unit. The recording unit in which learning data is recorded may be provided in the information processing apparatus 50 or may be provided in an apparatus (e.g., a server or a PC) other than the information processing apparatus 50. The recording unit in which learning data may be designated by a user or may be determined in advance.

The recording controller 66 may cause learning history information indicative of a learning history of an artificial intelligence to be recorded in the recording unit in association with learning data that has been learned by the artificial intelligence. The learning history information may be attached to the learning data. The learning history information associated with the learning data indicates previous learning data learned by artificial intelligences that have learned the learning data. The learning history information may indicate correspondence between an artificial intelligence and learning data learned by the artificial intelligence in the past. Furthermore, the learning history information may indicate an order in which learning data sets were learned by an artificial intelligence. For example, learning data identification information for identifying learning data learned by an artificial intelligence in the past is associated with the artificial intelligence, and the recording controller 66 associates the learning data identification information associated with the artificial intelligence that has learned the learning data with the learning data. For example, in a case where artificial intelligence α learned learning data sets A, B, and C in this order, information indicating that the artificial intelligence α learned the learning data set A, B, and C in this order is associated with the learning data C as learning history information. The term "learning data set" here is used for convenience, and it is not intended to be limiting. A learning data set may comprise a plurality of learning data pieces or may just be one learning data piece. Examples of learning data pieces include images, documents, videos, and more.

The learning controller 68 is configured to cause an artificial intelligence to learn learning data. For example, the learning controller 68 causes an artificial intelligence to learn influencing learning data or non-influencing learning data that has not been learned by the artificial intelligence, depending on a purpose of learning of the artificial intelligence. More specifically, the learning controller 68 causes a second artificial intelligence to learn influencing learning data or non-influencing learning data classified as a result of learning of a first artificial intelligence depending on a purpose of the second artificial intelligence. The first and second artificial intelligences are different artificial intelligences. Specifically, the learning controller 68 causes the second artificial intelligence to learn improving learning data or decreasing learning data classified as a result of learning the first artificial intelligence depending on a purpose of learning of the second artificial intelligence. The learning controller 68 may cause the second artificial intelligence to learn improving learning data or non-improving learning data classified as a result of learning of the first artificial intelligence depending on a purpose of learning of the second artificial intelligence. The second artificial intelligence may be designated, for example, by a user or in advance.

Processing of the learning controller 68 is described by using a specific example. For example, in a case where performance of a function a of artificial intelligence α has improved as a result of learning of learning data set A and a purpose of learning of another artificial intelligence β is to improve the function a of the artificial intelligence β, the learning controller 68 causes the artificial intelligence β to learn the learning data set A. That is, since the learning data set A is classified as improving learning data that can improve performance of the function a, the learning controller 68 causes the artificial intelligence β to learn the learning data set A that is improving learning data that improves performance of the function a. In other words, in a case where the purpose of learning of the artificial intelligence β is to make performance of the artificial intelligence β close to performance of the artificial intelligence α, the artificial intelligence β is caused to learn the learning data set A that has improved performance of the artificial intelligence α.

Meanwhile, in a case where the purpose of learning of the artificial intelligence β is to not make the performance of the artificial intelligence β close to the performance of the artificial intelligence α, i.e., to make the performance of the artificial intelligence β different from the performance of the artificial intelligence α, the learning controller 68 causes the artificial intelligence β to learn decreasing learning data that has decreased the performance of the artificial intelligence α, non-influencing learning data learned by the artificial intelligence α, or non-improving learning data learned by the artificial intelligence α. In this way, the artificial intelligence β becomes an artificial intelligence with performance different from that of the artificial intelligence α is created.

A purpose of learning of an artificial intelligence is, for example, designated by a user. For example, a user designates an artificial intelligence (e.g., the artificial intelligence β) to learn learning data and a purpose of learning of the artificial intelligence by operating the UI unit 54. The learning controller 68 causes the artificial intelligence designated by the user to learn learning data that matches the purpose of learning designated by the user.

The learning controller 68 may cause the second artificial intelligence to learn influencing learning data classified by learning of a first artificial intelligence having a function corresponding to a function of the second artificial intelligence. The function corresponding to the function of the second artificial intelligence may be the same function as the function of the second artificial intelligence or may be a function similar to the function of the second artificial intelligence (e.g., a function whose difference from the function of the second artificial intelligence is equal to or smaller than a threshold value).

For example, in a case where performance of the function a of the artificial intelligence α has improved as a result of learning of the learning data set A by the artificial intelligence α, the learning controller 68 causes the artificial intelligence β having the function a to learn the learning data set A. That is, the learning controller 68 causes the artificial intelligence β to learn improving learning data that has improved performance of the artificial intelligence α. The artificial intelligences α and s may be designated, for example, by a user or in advance.

Furthermore, the learning controller 68 may cause the second artificial intelligence to learn influencing learning data classified by learning of a first artificial intelligence having a learning history corresponding to a learning history of the second artificial intelligence. The learning history corresponding to the learning history of the second artificial intelligence may be the same learning history as the learning history of the second artificial intelligence or may be a learning history similar to the learning history of the second artificial intelligence (e.g., a learning history whose difference from the learning history of the second artificial intelligence is equal to or smaller than a threshold value). The learning history is a history of learning of learning data by artificial intelligences in the past.

Figure 5:
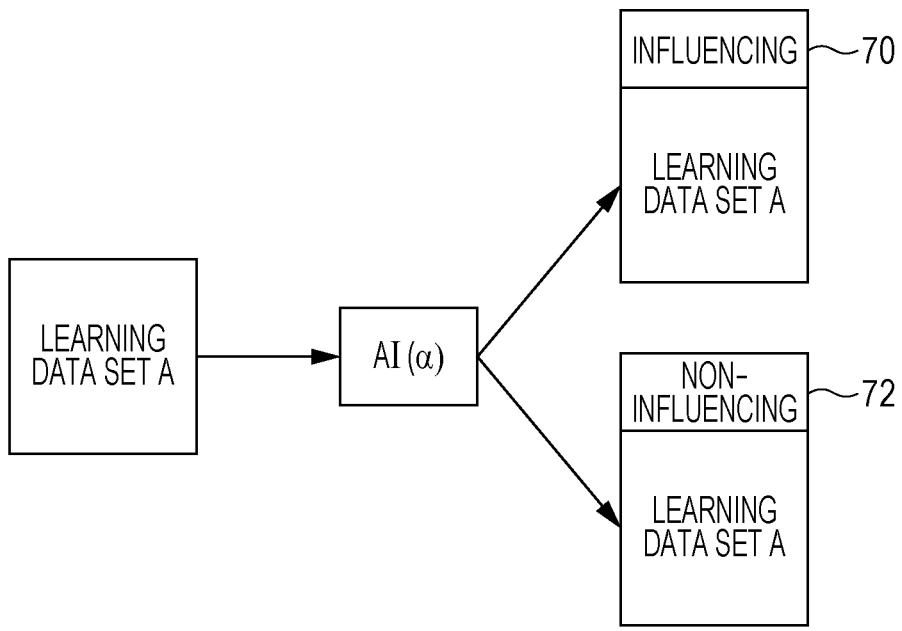
FIG. 5 illustrates a learning data set according to the second exemplary embodiment.
Figure 6:
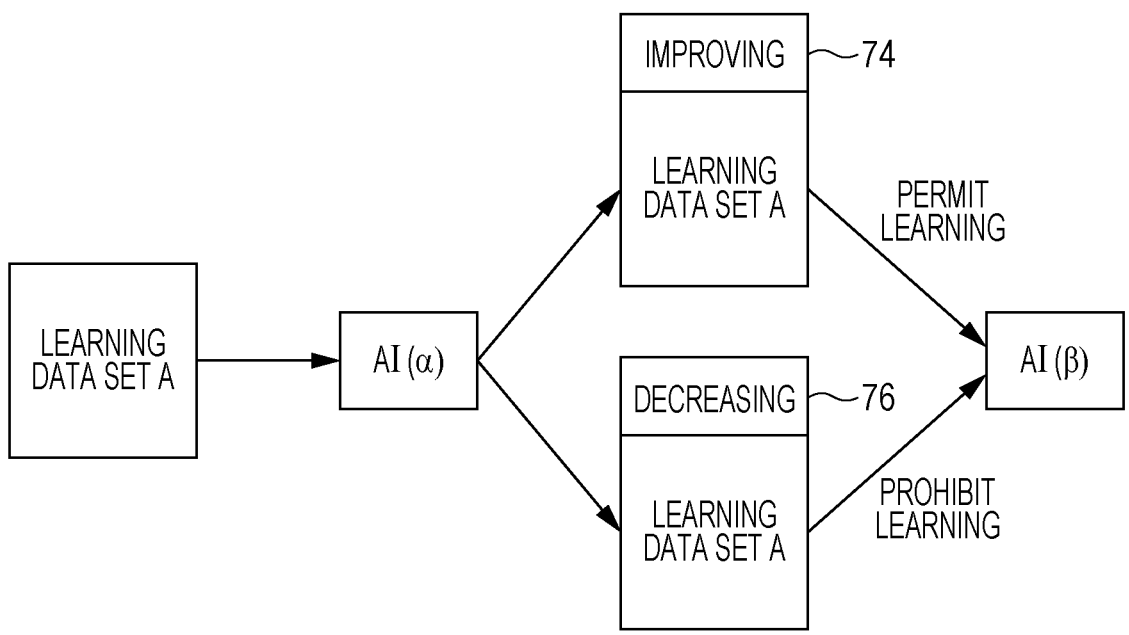
FIG. 6 illustrates a learning data set according to the second exemplary embodiment.
Figures 7, 8:
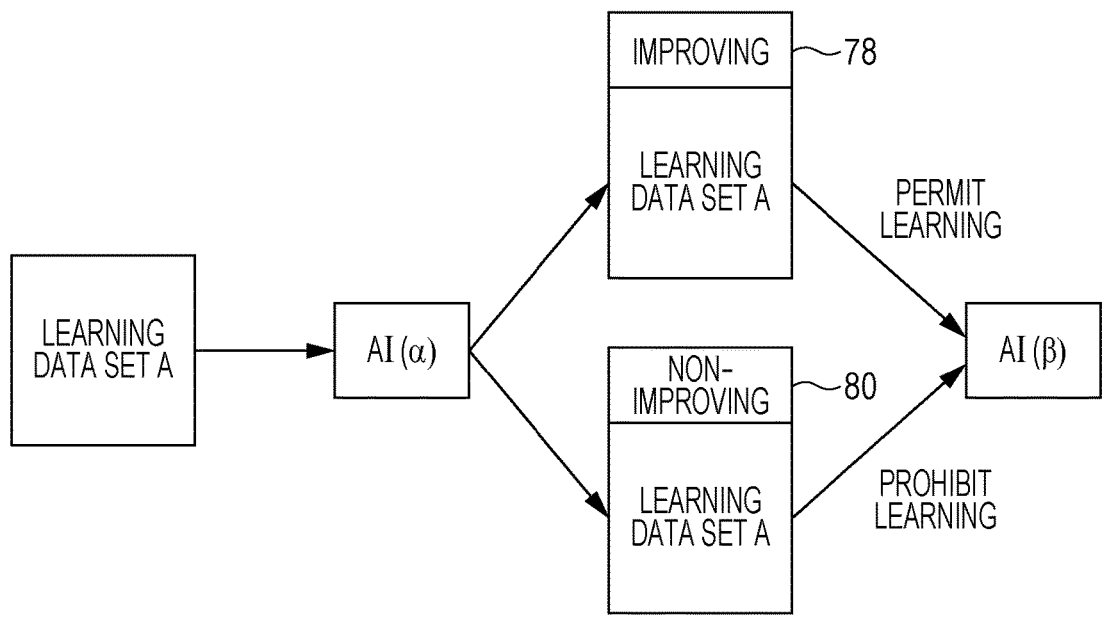
FIG. 7 illustrates a learning data set according to the second exemplary embodiment.
FIG. 8 illustrates a database of determination results.

Processing of the information processing apparatus 50 is described below with reference to FIGS. 5 through 7. FIGS. 5 through 7 illustrate examples of learning data according to the second exemplary embodiment.

As illustrated in FIG. 5, the learning data set A is designated as learning data to be determined, and the artificial intelligence α (AI(α) in FIG. 5) is designated as an artificial intelligence to learn the learning data set A. For example, when a user gives an instruction to determine whether or not the learning data set A is influencing learning data or non-influencing learning data by operating the UI unit 54, the determining unit 60 causes the artificial intelligence α to learn the learning data set A and executes a test for determining whether or not the learning data set A has influenced performance of the artificial intelligence α. That is, the determining unit 60 determines whether or not performance of the artificial intelligence α has changed before and after learning of the learning data set A. In a case where performance of the artificial intelligence α has changed, the determining unit 60 determines that the learning data set A is influencing learning data that has influenced performance of the artificial intelligence α. In a case where the performance of the artificial intelligence α has not changed, the determining unit 60 determines that the learning data set A is non-influencing learning data that has not influenced the performance of the artificial intelligence α.

In a case where the learning data set A is classified as influencing learning data, the attaching unit 62 attaches determination result information 70 indicating that the learning data set A is influencing learning data to the learning data set A, as illustrated in FIG. 5. In a case where the learning data set A is classified as non-influencing learning data, the attaching unit 62 attaches determination result information 72 indicating that the learning data set A is non-influencing learning data to the learning data set A, as illustrated in FIG. 5.

The recording controller 66 may cause the learning data set A classified as influencing learning data or non-influencing learning data to be recorded in the recording unit.

The determining unit 60 may determine whether or not performance of the artificial intelligence α has improved before and after learning of the learning data set A. In a case where performance of the artificial intelligence α after learning of the learning data set A has improved from performance of the artificial intelligence α before learning of the learning data set A, the determining unit 60 determines that the learning data set A is improving learning data that has improved performance of the artificial intelligence α. In this case, as illustrated in FIG. 6, the attaching unit 62 attaches determination result information 74 indicating that the learning data set A is improving learning data to the learning data set A. In a case where the performance of the artificial intelligence α after learning of the learning data set A has decreased from the performance of the artificial intelligence α before learning of the learning data set A, the determining unit 60 determines that the learning data set A is decreasing learning data that has decreased performance of the artificial intelligence α. In this case, as illustrated in FIG. 6, the attaching unit 62 attaches determination result information 76 indicating that the learning data set A is decreasing learning data to the learning data set A.

The recording controller 66 may cause the learning data set A classified as improving learning data or decreasing learning data to be recorded in the recording unit.

Furthermore, in a case where the learning data set A is classified as improving learning data, the learning controller 68 may cause designated another artificial intelligence (AI (β) in FIG. 6) to learn the learning data set A. This can improve performance of the artificial intelligence S. Meanwhile, in a case where the learning data set A is classified as decreasing learning data, the learning controller 68 may prohibit the artificial intelligence β to learn the learning data set A. This prevents a decrease in performance of the artificial intelligence β.

In a case where performance of the artificial intelligence α after learning of the learning data set A has not improved from performance of the artificial intelligence α before learning of the learning data set A, the determining unit 60 may determine that the learning data set A is non-improving learning data that has not improved performance of the artificial intelligence α. In a case where the performance of the artificial intelligence α after learning of the learning data set A has improved from the performance of the artificial intelligence α before learning of the learning data set A, the determining unit 60 determines that the learning data set A is improving learning data that has improved performance of the artificial intelligence α. In a case where the learning data set A is classified as improving learning data, the attaching unit 62 attaches determination result information 78 indicating that the learning data set A is improving learning data to the learning data set A, as illustrated in FIG. 7. In a case where the learning data set A is classified as non-improving learning data, the attaching unit 62 attaches determination result information 80 indicating that the learning data set A is non-improving learning data to the learning data set A, as illustrated in FIG. 7.

The recording controller 66 may cause the learning data set A classified as improving learning data or non-improving learning data to be recorded in the recording unit.

Furthermore, in a case where the learning data set A is classified as improving learning data, the learning controller 68 may cause another artificial intelligence (AI(β) in FIG. 7) to learn the learning data set A. This can improve performance of the artificial intelligence β.

Meanwhile, in a case where the learning data set A is classified as non-improving learning data, the learning controller 68 prohibits the artificial intelligence β from learning the learning data set A. This prevents a decrease in performance of the artificial intelligence β.

The determining unit 60 may determine, for each function of each artificial intelligence, influence of the learning data on the artificial intelligence and create management information (e.g., database) for managing a result of the determination. The management information may be stored in the storage unit 56 or may be stored in an apparatus other than the information processing apparatus 50.

FIG. 8 illustrates an example of a database that is an example of the management information. The database illustrated in FIG. 8 is a database that stores determination results indicating influence of the learning data set A on artificial intelligences that have learned the learning data set A. In this database, the determination results indicate influence of the learning data set A on each function of the artificial intelligences.

For example, artificial intelligence α (AI(α) in FIG. 8) and artificial intelligence β (AI(β) in FIG. 8) each has more than functions including character recognition, translation, creativity, and problem-solving. A determination result A indicates that performance has improved markedly. A determination result B indicates that performance has improved slightly. A determination result C indicates that performance has not changed. A determination result D indicates that performance has decreased.

As a result of learning of the learning data A, a character recognition rate of the artificial intelligence α has improved markedly, translation accuracy of the artificial intelligence α has improved slightly, creativity of the artificial intelligence α has not changed, and problem-solving ability of the artificial intelligence α has decreased. That is, performance of the character recognition function of the artificial intelligence α has improved markedly, performance of the translation function of the artificial intelligence α has improved slightly, performance of the creativity of the artificial intelligence α has not changed, and performance of the problem-solving ability of the artificial intelligence α has decreased.

As a result of learning of the learning data set A, a character recognition rate, translation accuracy, and creativity of the artificial intelligence β have not changed, and problem-solving ability of the artificial intelligence β has decreased. That is, performance of the character recognition function, translation function, and creativity of the artificial intelligence β has not changed, and performance of the problem-solving ability of the artificial intelligence β has decreased.

Thanks to determination results being managed as described above, influence of the learning data on performance of each artificial intelligence can be evaluated. In the example illustrated in FIG. 8, comparison between the artificial intelligence α and the artificial intelligence β shows that the performance of the artificial intelligence β has not improved as much as the performance of the artificial intelligence α has improved despite the fact that both the artificial intelligence α and the artificial intelligence β have learned the same learning data set A. In other words, the comparison shows that improvement of the performance of the artificial intelligence α is larger than improvement of the performance of the artificial intelligence @.

Since artificial intelligence α and the artificial intelligence β often have different learning histories, it may still be difficult to generalize influence of learning of the learning data set A on performance of an artificial intelligence based only these determination results. However, these determination results can provide a way to evaluate influence of learning of the learning data set A on different artificial intelligences.

Furthermore, in a case where learning histories of artificial intelligences are managed, it is possible to estimate a learning history that is likely to improve performance of an artificial intelligence when the artificial intelligence learns a particular data set. For example, in a case where the artificial intelligences α and β with different learning histories use the same algorithm and learned the same learning data set A, if influence of the learning of the learning data set A on the artificial intelligence α is different from that on the artificial intelligence β, the difference is likely to have resulted from differences in their learning histories. This way, it is possible to estimate a learning history that is likely to improve performance of an artificial intelligence when the artificial intelligence learns the learning data set A.

Furthermore, in a case where the artificial intelligence α and the artificial intelligence β use different algorithms, it is possible to estimate an algorithm that is likely to improve performance of an artificial intelligence when the artificial intelligence learns a particular data set. In the example illustrated in FIG. 8, improvement of the performance of the artificial intelligence α by learning of the learning data set A is larger than improvement of the performance of the artificial intelligence β by learning of the learning data set A. Therefore, it can be estimated that the algorithm used by the artificial intelligence α may have accounted for the improvement in performance of the artificial intelligence α when the artificial intelligence α learned the learning data set A.

Furthermore, a database may manage, for each artificial intelligence, an algorithm used by the artificial intelligence, a time of start of use of the artificial intelligence, a time of start of learning of the artificial intelligence, and a learning period of the artificial intelligence, and the like. Sometimes, one or more factors may have influenced performance of an artificial intelligence that learned a particular learning data set. In a case where these details are managed, it is possible to estimate whether influence of learning of a particular data set on performance of an artificial intelligence (e.g., improvement of the performance or decrease of the performance) is due to the learning data itself or other factors (e.g., an algorithm or a learning history of the artificial intelligence).

A modification of the second exemplary embodiment is described below.

First Modification of Second Exemplary Embodiment

A first modification of the second exemplary embodiment is described below. In the first modification of the second exemplary embodiment, the determining unit 60 causes an artificial intelligence to learn a combination of learning data sets and determines whether or not the combination of has influenced performance of the artificial intelligence. Then, the determining unit 60 classifies the combination as a combination that has influenced performance of the artificial intelligence or a combination that has not influenced performance of the artificial intelligence. The term "learning data set" here is, again, used for convenience, and it is not intended to be limiting. A learning data set may comprise a plurality of learning data pieces or may just be one learning data piece. Examples of learning data pieces include images, documents, videos, and more.

The determining unit 60 may determine whether or not a combination of learning data sets has improved performance of an artificial intelligence and classify the combination as a combination that has improved performance of the artificial intelligence or a combination that has decreased the performance of the artificial intelligence.

The determining unit 60 may determine whether or not a combination of learning data sets has improved performance of an artificial intelligence and classify the combination as a combination that has improved performance of the artificial intelligence or a combination that has not improved performance of the artificial intelligence.

The attaching unit 62 attaches determination result information indicative of a result of determination of the determining unit 60 to a combination of learning data sets. The recording controller 66 may cause the combination to which the determination result information is attached to be recorded in the recording unit.

Causing artificial intelligence to learn a combination of learning data sets means concurrently giving the learning data sets to the artificial intelligence and causing the artificial intelligence to learn the learning data sets, or giving the learning data sets of the combination separately to the artificial intelligence in and causing the artificial intelligence to learn the learning data sets separately.

Figure 9:
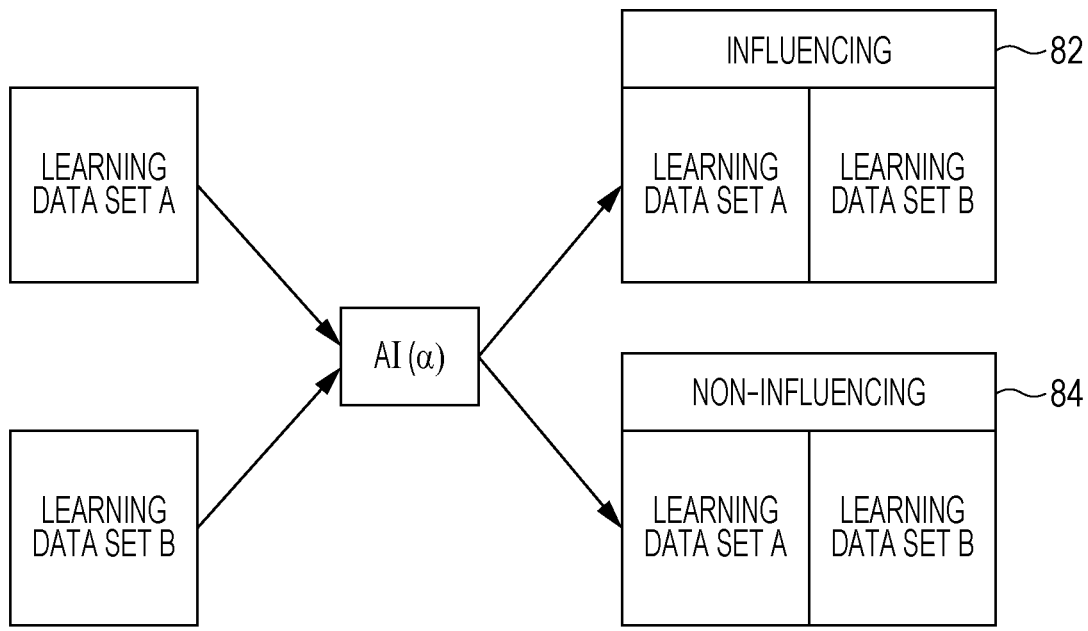
FIG. 9 illustrates learning data sets according to a first modification of the second exemplary embodiment.
Figure 10:
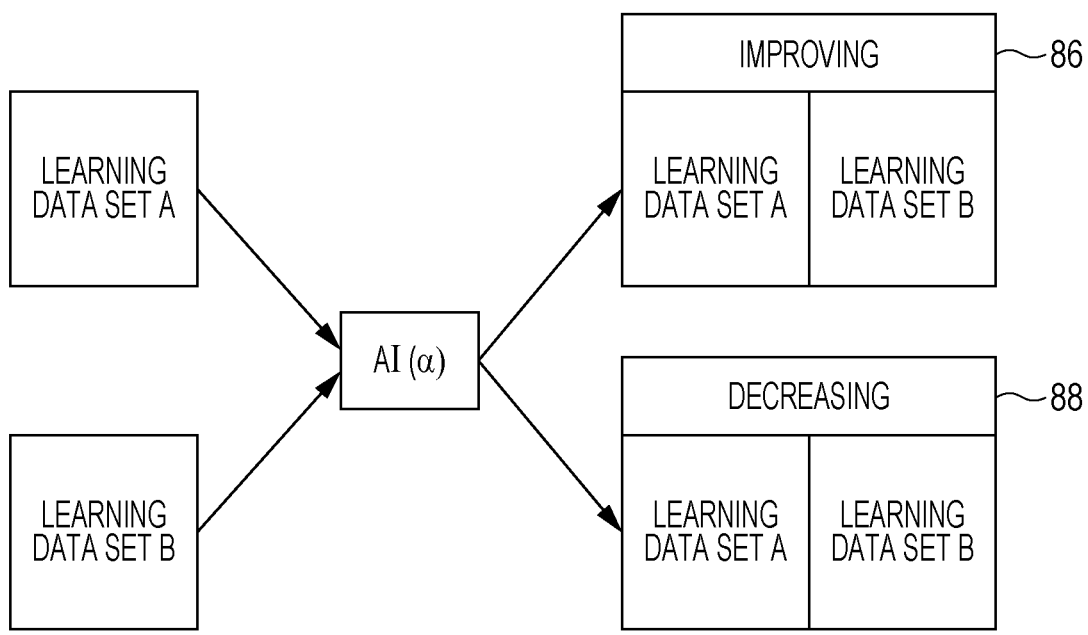
FIG. 10 illustrates learning data sets according to the first modification of the second exemplary embodiment.
Figures 11, 12:
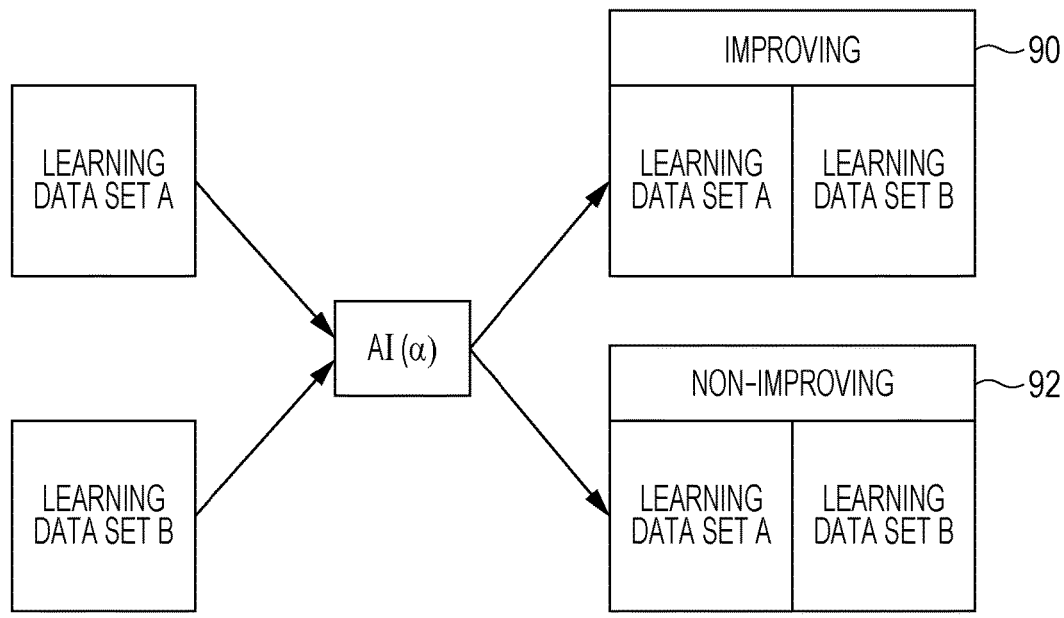
FIG. 11 illustrates learning data sets according to the first modification of the second exemplary embodiment.
FIG. 12 illustrates a database of determination results.

Processing according to the first modification of the second exemplary embodiment is described below with reference to FIGS. 9 through 11. FIGS. 9 through 11 illustrate an example of learning data according to the first modification of the second exemplary embodiment.

As illustrated in FIG. 9, for example, a combination of learning data sets A and B is designated as learning data, and artificial intelligence α (AI(α) in FIG. 9) is designated as artificial intelligence that learns the combination of learning data sets A and B. For example, when a user gives an instruction to determine the combination of learning data sets A and B by operating the UI unit 54, the determining unit 60 causes the artificial intelligence α to learn the combination of learning data sets A and B and executes a test for determining whether or not the combination of learning data sets A and B has influenced performance of the artificial intelligence α. That is, the determining unit 60 determines whether or not performance of the artificial intelligence α has changed before and after learning of the combination of learning data sets A and B. In a case where the performance of the artificial intelligence α has changed, the determining unit 60 determines that the combination of learning data sets A and B is a combination that has influenced the performance of the artificial intelligence α. In a case where the performance of the artificial intelligence α has not changed, the determining unit 60 determines that the combination of learning data sets A and B is a combination that has not influenced the performance of the artificial intelligence α.

In a case where the combination of learning data sets A and B is classified as a combination that has influenced performance of the artificial intelligence α, the attaching unit 62 attaches determination result information 82 indicating that the combination of learning data sets A and B is a combination that has influenced performance of the artificial intelligence α to the combination of learning data sets A and B, as illustrated in FIG. 9. In a case where the combination of learning data sets A and B is classified as a combination that has not influenced performance of the artificial intelligence α, the attaching unit 62 attaches determination result information 84 indicating that the combination of learning data sets A and B is a combination that has not influenced performance of the artificial intelligence α to the combination of learning data sets A and B, as illustrated in FIG. 9.

The recording controller 66 may cause the combination of learning data sets A and B classified as a combination that has influenced performance of the artificial intelligence α or a combination that has not influenced performance of the artificial intelligence α to be recorded in the recording unit.

The determining unit 60 may determine whether or not performance of the artificial intelligence α has improved before and after learning of the combination of learning data sets A and B. In a case where the performance of the artificial intelligence α after learning of the combination of learning data sets A and B has improved from the performance of the artificial intelligence α before learning of the combination of learning data sets A and B, the determining unit 60 determines that the combination of learning data sets A and B is a combination that has improved the performance of the artificial intelligence α. In this case, as illustrated in FIG. 10, the attaching unit 62 attaches determination result information 86 indicating that the combination of learning data sets A and B is a combination that has improved performance of the artificial intelligence α to the combination of learning data sets A and B. In a case where the performance of the artificial intelligence α after learning of the combination of learning data sets A and B has decreased from the performance of the artificial intelligence α before learning of the combination of learning data sets A and B, the determining unit 60 determines that the combination of learning data sets A and B is a combination that has decreased the performance of the artificial intelligence α. In this case, as illustrated in FIG. 10, the attaching unit 62 attaches determination result information 88 indicating that the combination of learning data sets A and B is a combination that has decreased the performance of the artificial intelligence α to the combination of learning data sets A and B.

The recording controller 66 may cause the combination of learning data sets A and B that is classified as a combination that has improved performance of the artificial intelligence α or a combination that has decreased performance of the artificial intelligence α to be recorded in the recording unit.

In a case where the combination of learning data sets A and B has improved performance of the artificial intelligence α, the learning controller 68 may cause designated another artificial intelligence (e.g., the artificial intelligence β) to learn the combination of learning data sets A and B. Meanwhile, in a case where the combination of learning data sets A and B has decreased performance of the artificial intelligence α, the learning controller 68 may prohibit another artificial intelligence from learning the combination of learning data sets A and B.

In a case where performance of the artificial intelligence α after learning of the combination of learning data sets A and B has not improved from performance of the artificial intelligence α before learning of the combination of learning data sets A and B, the determining unit 60 may determine that the combination of learning data sets A and B is a combination that has not improved the performance of the artificial intelligence α. In a case where the performance of the artificial intelligence α after learning of the combination of learning data sets A and B has improved from the performance of the artificial intelligence α before learning of the combination of learning data sets A and B, the determining unit 60 determines that the combination of learning data sets A and B is a combination that has improved the performance of the artificial intelligence α. In a case where the combination of learning data sets A and B is classified as a combination that has improved the performance of the artificial intelligence α, the attaching unit 62 attaches determination result information 90 indicating that the combination of learning data sets A and B is a combination that has improved the performance of the artificial intelligence α to the combination of learning data sets A and B, as illustrated in FIG. 11. In a case where the combination of learning data sets A and B is classified as a combination that has not improved the performance of the artificial intelligence α, the attaching unit 62 attaches determination result information 92 indicating that the combination of learning data sets A and B is a combination that has not improved the performance of the artificial intelligence α to the combination of learning data sets A and B, as illustrated in FIG. 11.

The recording controller 66 may cause the combination of learning data sets A and B classified as a combination that has improved the performance of the artificial intelligence α or a combination that has not improved the performance of the artificial intelligence α to be recorded in the recording unit.

In a case where the combination of learning data sets A and B is classified as a combination that has not improved performance of the artificial intelligence α, the learning controller 68 may prohibit another artificial intelligence from learning the combination of learning data sets A and B.

The determining unit 60 may determine, for each function of each artificial intelligence, influence of learning of a combination of learning data sets on an artificial intelligence and create management information (e.g., a database) for managing determination results. The management information may be recorded in the storage unit 56 or may be recorded in an apparatus other than the information processing apparatus 10.

FIG. 12 illustrates an example of a database that is an example of the management information. The database illustrated in FIG. 12 is a database that stores determination results indicating influence of the combination of learning data sets A and B on artificial intelligences that have learned the combination of learning data sets A and B. In this database, the determination results indicate influence of the combination of learning data sets A and B on each function of the artificial intelligences. Meanings of determination results A, B, C, and D are the same as the meanings of the determination results illustrated in FIG. 8.

As a result of learning of the combination of learning data sets A and B, a character recognition rate of the artificial intelligence α has improved markedly, translation accuracy of the artificial intelligence α has improved slightly, creativity of the artificial intelligence α has not changed, and problem-solving ability of the artificial intelligence α has decreased. That is, performance of a character recognizing function of the artificial intelligence α has improved markedly, performance of a translation function of the artificial intelligence α has improved slightly, performance of creativity of the artificial intelligence α has not changed, and performance of problem-solving ability of the artificial intelligence α has decreased.

As a result of learning of the combination of learning data sets A and B, a character recognition rate, translation accuracy, and creativity of the artificial intelligence R have not changed, and problem-solving ability of the artificial intelligence β has decreased. That is, performance of a character recognizing function, a translation function, and creativity of the artificial intelligence β have not changed, and performance of problem-solving ability of the artificial intelligence s has decreased.

Thanks to determination results being managed as described above, influence of learning a combination of learning data sets on each artificial intelligence can be evaluated. In the example illustrated in FIG. 12, comparison between the artificial intelligence α and the artificial intelligence β shows that the performance of the artificial intelligence β has not improved as much as the performance of the artificial intelligence α despite the fact that the artificial intelligence α and the artificial intelligence β have learned the same combination of learning data sets A and B. In other words, the comparison shows that improvement of the performance of the artificial intelligence α is larger than improvement of the performance of the artificial intelligence β.

In a case where an artificial intelligence learns the learning data sets A and B of the combination separately, a database may store information indicating that in what order the learning data sets A and B are learned. This is because the order of learning may account for influence of the learning on performance of the artificial intelligence. That is, determination results obtained in a case where an artificial intelligence learns the learning data set A and then the learning data set B and determination results obtained in a case where the artificial intelligence learns the learning data set A and then the learning data set B may be both managed in a database.

Although the determining unit 60 causes an artificial intelligence to learn a combination of two learning data sets in the above example, the determining unit 60 may cause an artificial intelligence to learn a combination of three or more learning data sets and determine influence of the learning.

A combination of learning data sets may comprise only learning data sets of the same kind or format, or may comprise learning data sets of different kinds or format. For example, the combination of learning data sets may be a combination of a plurality of document data sets. Alternatively, the combination of learning data sets may be a combination of a document data set and an image data set. These combinations are merely examples, and other combinations are also possible. Learning data sets included in a combination may be designated by a user.

Second Modification of Second Exemplary Embodiment

A second modification of the second exemplary embodiment is described below. In the second modification of the second exemplary embodiment, the determining unit 60 determines end of life of an artificial intelligence. The "end of life" as used herein means a state that performance of an artificial intelligence is not improved by learning new learning data or that improvement of performance of the artificial intelligence achieved by learning new learning data is less than a threshold value. Determination that an artificial intelligence has reached end of life is used as a criterion for prompting a user to exchange the artificial intelligence or change an algorithm of the artificial intelligence.

Figure 13:
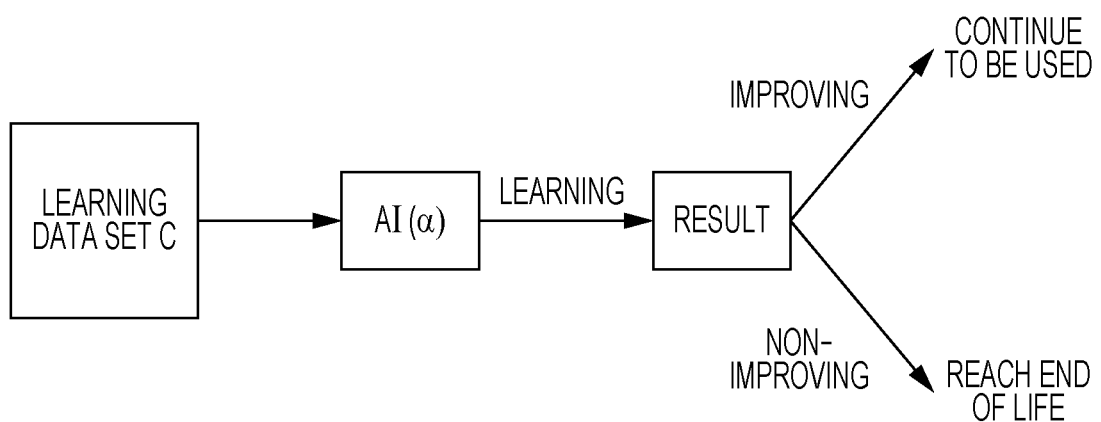
FIG. 13 illustrates a learning data set according to a second modification of the second exemplary embodiment.

For example, as illustrated in FIG. 13, the determining unit 60 causes an artificial intelligence α to learn learning data set C that has not yet been learned by the artificial intelligence α and determines whether or not the performance of the artificial intelligence α has improved as a result of the learning. In a case where the performance of the artificial intelligence α has improved, the determining unit 60 determines that the artificial intelligence α has not reached end of life. In a case where the performance of the artificial intelligence α has not improved, the determining unit 60 determines that the artificial intelligence α has reached end of life. Even in a case where the performance of the artificial intelligence α has improved, the determining unit 60 may determine that the artificial intelligence α has reached end of life in a case where the improvement is less than a threshold value.

In a case where it is determined that the artificial intelligence α has reached end of life, the controller 64 may output information such as information indicative of recommendation to replace the artificial intelligence with another artificial intelligence or information indicative of recommendation to change an algorithm of the artificial intelligence. For example, the controller 64 may cause the information indicative of such recommendation to be displayed on the display of the UI unit 54 or may output a sound (e.g., speech, tune) indicative of the recommendation from a speaker.

Note that the determining unit 60 may cause the artificial intelligence α to learn the same learning data plural times successively or at predetermined time intervals and determine the end of life of the artificial intelligence α on the basis of results of the plurality of learning rounds.

The determining unit 60 may cause the artificial intelligence α to learn a plurality of different learning data sets and determine the end of life of the artificial intelligence α on the basis of results of learning of the plurality of different learning data sets. For example, in a case where the number learning data sets that have improved the performance of the artificial intelligence α is less than a threshold value, the determining unit 60 determines that the artificial intelligence α has reached end of life. In a case where the number of learning data sets that have improved the performance of the artificial intelligence α is equal to or larger than the threshold value, the determining unit 60 determines that the artificial intelligence α has not reached end of life.

FIG. 14 illustrates another example. In this example, the determining unit 60 causes artificial intelligences α and β that have not learned learning data set C to learn the learning data C. The determining unit 20 then compares a result of the learning of the learning data set C by the artificial intelligence α and a result of the learning of the learning data set C by the artificial intelligence β. In a case where a difference between the result of the learning of the artificial intelligence α and the result of the learning of the artificial intelligence β is less than a threshold value, the determining unit 60 determines that neither of the artificial intelligence α or the artificial intelligence β has reached end of life. In a case where the different between the result of the learning of the artificial intelligence α and the result of the learning of the artificial intelligence β is equal to or larger than the threshold value, the determining unit 60 determines that, among the artificial intelligences α and β, an artificial intelligence having a lower learning effect is regarded as having reached end of life. One example of an artificial intelligence having a lower learning effect is an artificial intelligence whose performance has not improved as much as other artificial intelligences that learned the learning data set. Another example is an artificial intelligence whose performance has decreased more than performance of other artificial intelligences that have learned the learning data set.

The artificial intelligences α and s may be artificial intelligences having the same or similar learning history or may be artificial intelligences having learning histories that are not the same or similar. A case where the learning histories are similar is a case where a difference between the learning history of the artificial intelligence α and the learning history of the artificial intelligence β is less than a threshold value.

The processing of the determining unit 60, the attaching unit 62, the recording controller 66, and the learning controller 68 may be executed by an artificial intelligence. For example, an artificial intelligence instructed to learn learning data may execute these kinds of processing.

Functions of the units of the information processing apparatuses 10 and 50 are realized, for example, by cooperation of hardware and software. Specifically, the information processing apparatuses 10 and 50 have one or more processors such as a CPU (not illustrated). The one or more processors read out and execute a program stored in a storage device (not illustrated), and thereby the functions of the units of the information processing apparatuses 10 and 50 are realized. The program is stored in the storage device through a recording medium such as a CD or a DVD or a communication path such as a network. In another example, the functions of the units of the information processing apparatuses 10 and 50 may be realized by a hardware resource such as a processor, an electronic circuit, or an application specific integrated circuit (ASIC). A device such as a memory may be used in realizing the functions of the units of the information processing apparatuses 10 and 50. In still another example, the functions of the units of the information processing apparatuses 10 and 50 may be realized, for example, by a digital signal processor (DSP) or a field programmable gate array (FPGA).

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising a controller configured to:
   determine whether learning data learned by a first artificial intelligence has improved performance of the first artificial intelligence or not; and
   group ones of the learning data that are determined to have improved the performance of the first artificial intelligence into a first group and group ones of the learning data that are determined not to have improved the performance of the first artificial intelligence into a second group;
   record the learning data including the first group and the second group in a recording unit; and
   permit a second artificial intelligence to learn only the learning data of the first group recorded in the recording unit, and prohibiting the second artificial intelligence from learning the learning data of the second group.

2. The information processing apparatus according to claim 1, wherein
   the controller causes the learning data to be recorded in the recording unit whereby learning data that has been learned by different artificial intelligences are distinguishable.

3. The information processing apparatus according to claim 1, wherein
   the controller causes the learning data to be recorded in the recording unit in association with a learning history of the one of the first artificial intelligence and the second artificial intelligence that has learned the learning data.

4. The information processing apparatus according to claim 1, wherein
   the controller causes the learning data to be recorded in the recording unit in such manner that an influencing combination of learning data sets and a non-influencing combination of learning data sets are distinguishable.

5. A non-transitory computer readable medium storing a program causing a computer to execute a process for image processing, the process comprising:
   determining whether learning data learned by a first artificial intelligence has improved performance of the first artificial intelligence or not; and
   grouping ones of the learning data that are determined to have improved the performance of the first artificial intelligence into a first group and grouping ones of the learning data that are determined not to have improved the performance of the first artificial intelligence into a second group;
   recording the learning data including the first group and the second group in a recording unit; and
   permitting a second artificial intelligence to learn only the learning data of the first group recorded in the recording unit, and prohibiting the second artificial intelligence from learning the learning data of the second group.

* * * * *